Patented July 15, 1952

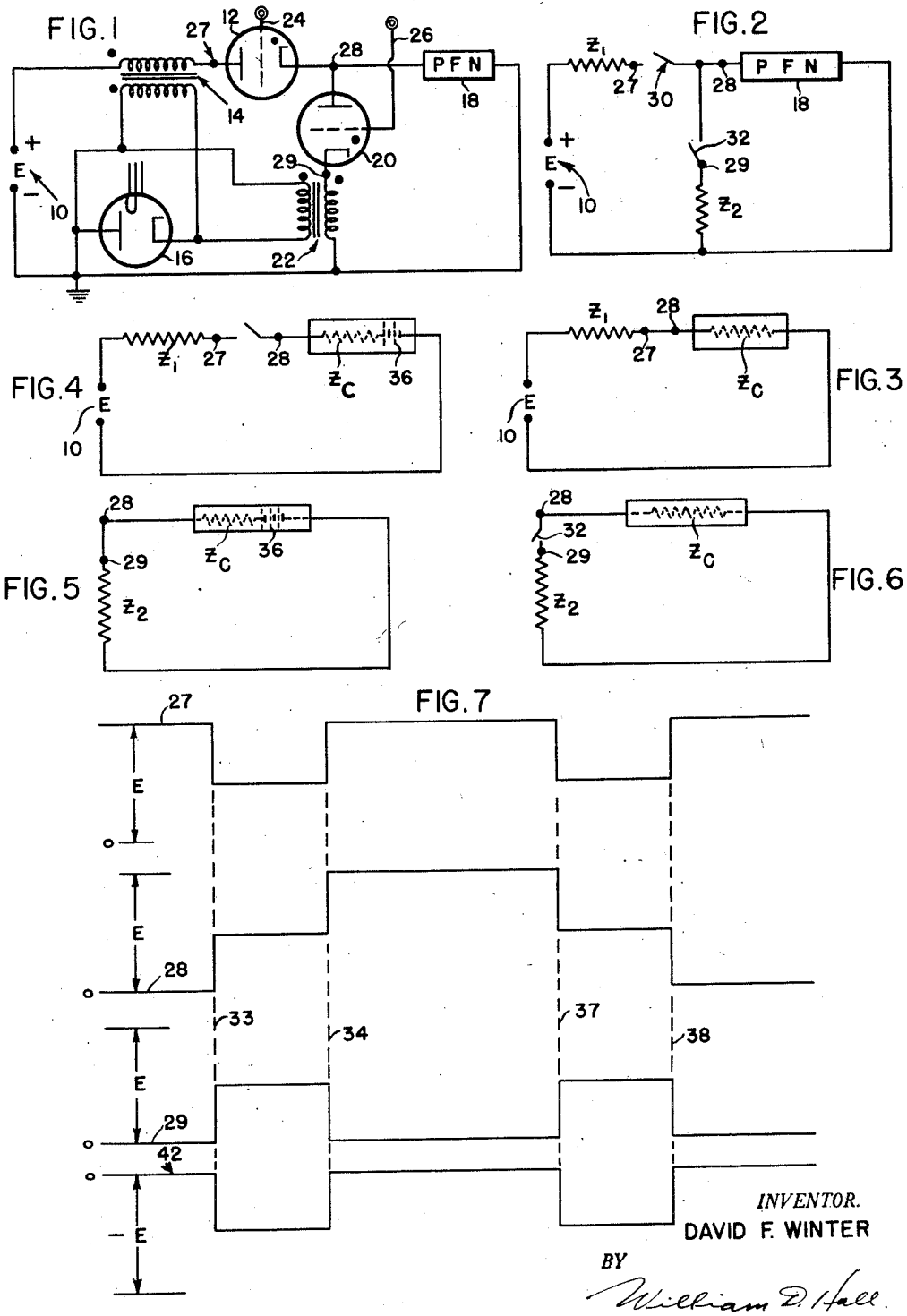

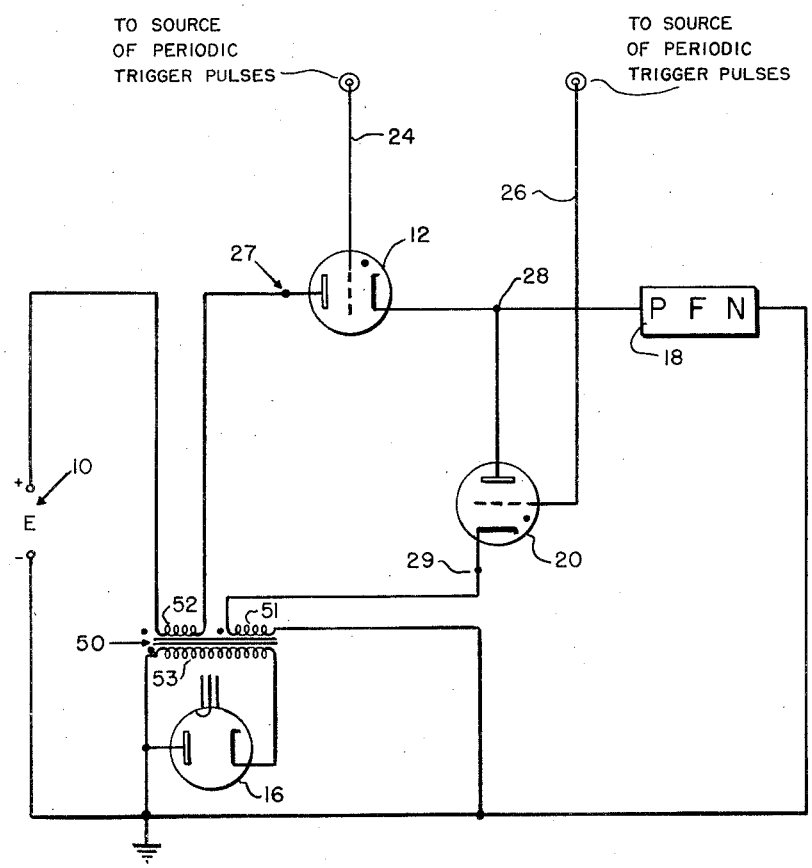

2,603,752

UNITED STATES PATENT OFFICE 2,603,752

VOLTAGE PULSE GENERATOR

David F. Winter, Cambridge, Mass., assignor, by mesne assignments, to the United States of America as represented by the Secretary of War Application September 14, 1945, Serial No. 616,362

4 Claims. (Cl. 250—36)

This invention relates to electrical circuits and more particularly to modulators for use with high frequency oscillators.

Modulators for high frequency oscillators that employ pulse forming lines or networks have been in use for several years. These modulators are capable of applying a suitable high voltage pulse to a high frequency oscillator, for example a magnetron oscillator, at intervals of perhaps one thousand microseconds. It is usually very difficult to produce by conventional means two pulses spaced at an interval of, say, ten microseconds apart that are of sufficient amplitude to operate a magnetron oscillator. It is often desirable, however, to produce two or more of these relatively short pulses spaced close together for pulse coding an oscillator or for other similar reasons.

It is an object of the present invention, therefore, to provide a simple novel circuit for producing high amplitude voltage pulses of relatively short time duration and with a short controllable time interval between pulses.

It is a further object of the present invention to provide a circuit embodying the desirable characteristics of a line type modulator in addition to a novel means for rapidly charging the pulse forming circuit.

For a better understanding of the invention, together with other and further objects thereof, reference is had to the following description taken in connection with the accompanying drawing in which:

Fig. 1 is a schematic wiring diagram of the invention;

Figs. 2, 3, 4, 5 and 6 are equivalent circuits of the invention under various conditions of operation;

Fig. 7 is a series of waveforms that may be obtained from the circuit of Fig. 1; and Fig. 8 is a modification of the schematic wiring diagram shown in Fig. 1.

The circuit of the invention shown in Fig. 1 consists of a high voltage direct current power supply 10 conventionally represented by the capital letter E and the plus and minus signs shown in Fig. 1. This power supply 10 should be capable of delivering a relatively large amount of energy for a short period of time and, therefore, it is preferably of the type that has a capacitor output. The positive terminal of power supply 10 is connected to the anode of a gas triode 12 through the primary of a pulse transformer 14. The secondary of transformer 14 is connected between the anode and cathode of a magnetron oscillator tube 16. The anode of tube 16 and the negative terminal of power supply 10 are both maintained at ground potential. A pulse forming network 18 is connected between the cathode of tube 12 and ground. The anode of a second gas triode tube 20 is connected to the cathode of tube 12 while the cathode of tube 20 is connected to ground through the primary of a second pulse transformer 22. The secondary of transformer 22 is also connected between the anode and cathode of tube 16 and, therefore, is connected in parallel with the secondary of transformer 14. Signal input leads 24 and 26 which are connected to the control grids of tubes 12 and 20, respectively, provide means for applying a control trigger pulse to these two tubes. Reference numbers 27, 28, and 29 have been added at anode and cathode of tube 12 and the cathode of tube 20, respectively, as an aid in describing the operation of the circuit.

Fig. 8 is similar to Fig. 1 except that the transformers 14 and 22 of Fig. 1 are replaced by a single transformer having two primary windings and a single secondary winding. Primary winding 52 replaces the primary winding of transformer 14, primary winding 51 replaces the primary winding of transformer 22, and secondary winding 53 replaces both of the secondary windings of transformers 14 and 22.

The operation of this invention may be best understood by reference to the equivalent circuits of Figs. 2 to 6 and the waveforms of Fig. 7.

In Fig. 2 the impedances represented by the primaries of transformers 14 and 22 of Fig. 1, or by the dual primaries 52 and 51 of transformer 50 of Fig. 8, have been replaced by the equivalent impedances $Z_1$ and $Z_2$. Tubes 12 and 20 have been replaced by their approximate equivalents, switches 30 and 32, respectively. Power supply 10 and pulse forming network 18 in Fig. 2 correspond to the similarly numbered elements in Fig. 1 and Fig. 8.

If network 18 is uncharged and a positive pulse is applied to the grid of tube 12 at a time 33, Fig. 7, the equivalent circuit is as shown in Fig. 3. Network 18 is represented by an impedance $Z_c$ which is the characteristic or surge impedance of network 18. The constants of the circuit are selected so that $Z_c=Z_1=Z_2$. The potential at point 27, Figs. 1 and 3, as a function of time, is as shown by waveform 27 of Fig. 7. Waveforms 28 and 29 also illustrate the change in potential at points 28 and 29, respectively. The potential at point 27 was originally at a potential E above ground where E is the potential of power supply 10. When tube 12 conducts (time 33) point 27 drops to ½E since $Z_1$ is equal to $Z_c$. The potential at point 27 remains at ½E for the time necessary to charge network 18 and at the end of this time point 27 again rises to the potential E. This time of rise is represented as time 34, Fig. 7. Network 18 is now charged to the full potential E so that the anode and cathode of tube 12, Fig. 1, are both at the same potential so tube 12 stops conducting and the control grid now regains control so that tube 12 is held cutoff. Fig. 4 shows the equivalent circuit of this condition. Network 18 is now represented by its characteristic impedance $Z_c$ and an imaginary battery 36. The potential of battery 36 is equal to the potential E of power supply 10. If a positive pulse is now applied at a time 37 to the control grid of tube 20, Fig. 1, this tube will conduct and the equivalent circuit of Fig. 1 will be as shown in Fig. 5. Point 28, which is for all practical purposes at the same as the potential as point 29, now drops to a potential of ½E. Point 29 was originally at zero potential, but this point rises to a potential of ½E minus any small drop in potential across tube 20, Fig. 1. Waveform 29, Fig. 7, represents the potential of point 29 as a function of time. This condition exists until all the energy stored in network 18 is discharged. At this time 38 point 28 drops to zero potential so conduction stops in tube 20, Fig. 1, and the control grid of this tube holds it cutoff. This completes one pulsing cycle of the circuit and the equivalent circuit is now that of Fig. 6 or Fig. 2 if potential source 10 and equivalent impedance $Z_1$ are added.

Referring once again to the circuit of Fig. 1, it can be seen that a negative pulse of amplitude ½E occurred at point 27 at time 33 which in turn caused a negative pulse to occur at the cathode of tube 16. It can also be seen that the positive pulse at point 29 that occurs at time 37 produces a negative pulse at the cathode of tube 16 through the action of transformer 22. These negative pulses are illustrated by waveform 42, Fig. 7. Waveforms 27 and 29 together illustrate that due to the fact that the secondaries of transformers 14 and 22 are connected in parallel a negative pulse at point 27 causes a positive pulse at point 29 and a positive pulse at point 29 causes a negative pulse at point 27. While this effect is not essential to the operation of the circuit, it actually reduces the potential across tubes 12 and 20, Fig. 1, when they are not conducting. This effect also indicates that transformers 14 and 22 may be combined into one transformer having a single secondary winding and two primary windings. The two primary windings would of course be connected in place of the primaries of transformers 14 and 22. This improvement is shown in Fig. 8. In transformer 50, primary winding 52 replaces the primary winding of transformer 14 and primary winding 51 replaces the primary winding of transformer 22, the secondary winding 53 of transformer 50 replacing both the secondary windings of transformers 14 and 22. This modification, as embodied in Fig. 8, does not change the manner of operation of the invention, as previously set forth. The only difference between the circuit of Fig. 1 and Fig. 8 is the employment of transformer 50 in place of transformers 14 and 22.

Reviewing briefly the operation of this circuit, a negative pulse is applied to the cathode of tube 16 at the instant a positive control pulse is applied to the grid of tube 12. The time duration of the pulse applied to tube 16 is determined by the constants of pulse forming network 18. A second negative pulse is applied to the cathode of tube 16 when a positive control pulse is applied to the grid of tube 20. Again the duration of the pulse applied to tube 16 is determined by the constants of network 18. Any number of pulses may be applied to tube 16 at regular or irregular intervals provided that tube 12 is triggered first and then tubes 20 and 12 are triggered alternately thereafter.

It can be seen from the above description that this circuit either alone or in combination with well known circuits for controlling the signals supplied at signal inputs 24 and 26 will find many useful applications in the field of electronics.

While there has been described what is at present considered the preferred embodiment of the invention, it will be obvious to those skilled in the art that various changes and modifications may be made therein without departing from the invention.

What is claimed is:

1. A pulse modulator comprising a power supply having at least a positive and a negative terminal, a first and a second pulse transformer, each having at least a primary and a secondary winding, a first and a second switch, a pulse-forming network, a load, means for connecting said pulse-forming network in shunt with the series combination of said first switch and the primary of said first transformer, means for connecting in a series combination said shunt combination, said second switch and the primary of said second transformer, means for connecting said last mentioned series combination between the positive and negative terminals of said power supply, means for connecting the secondary of said first transformer and the secondary of said second transformer to said load, and means for alternately periodically closing said first and said second switches, said means for connecting said transformers to said load producing a voltage pulse of a predetermined polarity across said load when said second switch is closed and producing a second pulse of like polarity across said load when said first switch is closed.

2. A pulse modulator comprising a power supply having a positive and a negative terminal, a pulse transformer having first and second primary windings and, a secondary winding, a first and a second switch, a pulse-forming network, a load, means for connecting said pulse-forming network in shunt with the series combination of said first switch and said first primary winding of said transformer, means for connecting in a series combination said shunt combination, said second switch and said second primary winding of said transformer, means for connecting said last mentioned series combination to said positive and negative terminals of said power supply, means for periodically alternately closing said first and second switches, and means for connecting said secondary winding of said transformer to said load for producing a voltage pulse of a predetermined polarity across said load when a said second switch is closed and producing a second pulse of like polarity across said load when said first switch is closed.

3. A pulse generator comprising a pulse forming network; a circuit connected to said pulse forming network for producing an electric charge therein, said circuit including a source of direct potential having a positive and a negative terminal, a primary winding of a first transformer, a first normally cut-off triode gas tube, and means connecting said positive terminal to said primary winding, said primary winding to the anode of said gas tube, the cathode of said gas tube to said pulse forming network and said pulse forming network to said negative terminal of said source of direct potential; a circuit connected to said pulse forming network for effecting a discharge thereof, said circuit including a primary winding of a second transformer, a second normally cut-off triode gas tube, and means connecting the cathode of said second gas tube to said last named primary winding, said last named primary winding to said pulse forming network, and said pulse forming network to the anode of said second gas tube; means connected to periodically alternately render operative said first and said second triode gas tubes by alternately delivering to the respective grids of said tubes positive voltage pulses, thereby charging and discharging said pulse forming network; a magnetron load; and means connecting the respective secondaries of said first and said second transformers across said magnetron load so that the energy of said charging and discharging circuits produces pulse voltages of the same polarity across said magnetron load.

4. A pulse generator as defined in claim 3 wherein the impedance of each primary winding of said transformers is equal to the characteristic impedance of said pulse forming network.

DAVID F. WINTER.

REFERENCES CITED

The following references are of record in the file of this patent:

UNITED STATES PATENTS

| Number | Name | Date |
| --- | --- | --- |
| 2,175,900 | Knight | Oct. 10, 1939 |
| 2,179,105 | Sidney | Nov. 7, 1939 |
| 2,249,819 | Gulliksen | July 22, 1941 |
| 2,409,897 | Rado | Oct. 27, 1946 |

OTHER REFERENCES

Radar System Fundamentals, Navships 900,017, Navy Department, April 1944, pages 177, 178 and 180.